United States Patent
Klonowski et al.

(10) Patent No.: US 11,047,312 B2
(45) Date of Patent: Jun. 29, 2021

(54) TURBOPROP COMPRISING AN INCORPORATED ELECTRICITY GENERATOR

(71) Applicant: SAFRAN HELICOPTER ENGINES, Bordes (FR)

(72) Inventors: Thomas Klonowski, Moissy-Cramayel (FR); David Cazaux, Moissy-Cramayel (FR); Olivier Lafargue, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/976,226

(22) PCT Filed: Feb. 28, 2018

(86) PCT No.: PCT/FR2018/050468
§ 371 (c)(1),
(2) Date: Aug. 27, 2020

(87) PCT Pub. No.: WO2019/166703
PCT Pub. Date: Sep. 6, 2019

(65) Prior Publication Data
US 2021/0003079 A1     Jan. 7, 2021

(51) Int. Cl.
*F02C 7/32* (2006.01)
*H02K 7/18* (2006.01)
*F02C 7/36* (2006.01)

(52) U.S. Cl.
CPC .......... *F02C 7/32* (2013.01); *H02K 7/1823* (2013.01); *F02C 7/36* (2013.01);
(Continued)

(58) Field of Classification Search
CPC ... F02C 7/32; F02C 7/36; F02C 6/206; H02K 7/1823; F05D 2220/324; F05D 2220/325;
(Continued)

(56) References Cited

U.S. PATENT DOCUMENTS

| 2,488,392 A | 11/1949 | Forsyth |
| 6,769,874 B2 * | 8/2004 | Arel ........................ B64C 11/02 |
| | | 416/60 |

(Continued)

FOREIGN PATENT DOCUMENTS

| EP | 2562085 A2 | 2/2013 |
| EP | 2977314 A1 | 1/2016 |

(Continued)

OTHER PUBLICATIONS

Search Report issued in French Patent Application No. 1659512 dated Jun. 7, 2017.

(Continued)

*Primary Examiner* — Charles Reid, Jr.
(74) *Attorney, Agent, or Firm* — Pearne & Gordon LLP

(57) ABSTRACT

An electrical generator is housed in an annular cavity between the casing and the propeller shaft of a turboprop, while imposing little or no additional space requirement and with lightweight ancillary equipment. The rotor of the generator is mounted on an autonomous shaft end. A flange of the outer casing is removable in order to access the generator and to enable its easy removal and remounting.

9 Claims, 1 Drawing Sheet

(52) U.S. Cl.
CPC .. *F05D 2220/324* (2013.01); *F05D 2220/325* (2013.01); *F05D 2220/50* (2013.01); *F05D 2220/76* (2013.01); *F05D 2260/4031* (2013.01)

(58) Field of Classification Search
CPC ............. F05D 2220/50; F05D 2220/76; F05D 2260/4031; F05D 2220/766; B64C 11/02
USPC .......................................................... 290/52
See application file for complete search history.

(56) References Cited

U.S. PATENT DOCUMENTS

| | | | | |
|---|---|---|---|---|
| 7,802,757 | B2* | 9/2010 | Dooley | F01D 15/10 |
| | | | | 244/60 |
| 8,757,972 | B2* | 6/2014 | Perkinson | B64D 15/12 |
| | | | | 416/1 |
| 8,829,702 | B1* | 9/2014 | Menheere | F02C 7/275 |
| | | | | 290/52 |
| 9,003,638 | B2* | 4/2015 | Menheere | H02K 7/1823 |
| | | | | 29/596 |
| 9,828,109 | B2* | 11/2017 | Mitrovic | B64C 11/44 |
| 10,717,539 | B2* | 7/2020 | Menheere | F02C 7/32 |
| 2014/0312722 | A1 | 10/2014 | Raad | |
| 2014/0339938 | A1* | 11/2014 | Passman | F02C 7/32 |
| | | | | 310/88 |

FOREIGN PATENT DOCUMENTS

| | | |
|---|---|---|
| FR | 3054265 A1 | 1/2018 |
| FR | 3057029 A1 | 4/2018 |
| GB | 584563 A | 1/1947 |
| WO | 03078248 A1 | 9/2003 |

OTHER PUBLICATIONS

International Search Report for issued in Application No. PCT/FR2018/050468 dated May 25, 2018.
Written Opinion for PCT/FR2018/050468 dated May 25, 2018.

* cited by examiner

TURBOPROP COMPRISING AN INCORPORATED ELECTRICITY GENERATOR

This is the National Stage of PCT international application PCT/FR2018/050468, filed on Feb. 28, 2018 entitled "TURBOPROP COMPRISING AN INCORPORATED ELECTRICITY GENERATOR", which is incorporated herein by reference in its entirety.

The subject of this invention is a turboprop comprising an incorporated electricity generator.

Turboprops comprise a gas generator, a propeller, and a propeller drive shaft that is normally driven by the gas turbine. Aircraft on which these turboprops are installed also include various electrical equipment that requires the addition of electricity generators.

Aircraft electricity generators are usually accessories mounted around the gas turbine, on gearboxes driven by energy take-off shafts rotating at the same time as the main shaft of the gas turbine but positioned in the radial direction around the axis of this turbine. The disadvantage of such devices is that they are fairly large, the gearboxes projecting radially around the gas turbine. And generator auxiliary equipment (protective casing and support for active parts, portion of the gearbox associated with the generator, etc.) is heavy.

Documents EP 2 562 085 A2, GB 584 563 A and U.S. Pat. No. 2,488,392 A describe turboprops in which a generator is arranged around the propeller support shaft and is surrounded by a casing; and documents EP 2 977 314 A1 and WO 03/078 248 A1 describe turboprops in which, on the contrary, a propeller support shaft surrounds a generator, another shaft extending inside the propeller support shaft.

The essential purpose of the invention is to improve the arrangement of electricity generators on turboprops so that the devices are more compact and lighter weight.

In a general form, the invention relates to a turboprop comprising in particular a propeller, a propeller support shaft, an electricity generator located around the propeller support shaft; the generator is surrounded by a casing forming part of the turboprop and surrounding the propeller support shaft, and this casing carries a generator stator; the invention is characterised in that the generator also carries shaft end support bearings, a rotor of the generator is supported by this shaft end, and the casing comprises a removable partition that carries one of said bearings, extending perpendicular to the propeller support shaft, and exposing an opening with a larger radius than the generator in the casing when said end plate is removed.

It is found that construction of the generator in this position is very good, because it does not cause an increase in the volume of the turboprop, and it then requires little auxiliary equipment, so that the mass of the assembly can be reduced. The active parts of the generator can be integrated almost directly into existing components that surround the propeller support shaft. Furthermore, good integration of the generator improves global accessibility to other engine accessories.

The generator remains supported with little added material, the stator in particular being supported by an existing part of the turboprop. And this construction makes it possible to install or to extract the generator by a movement along the axial direction of the propeller support shaft, simply by disassembling the end plate, which is easy to do if the end plate is mounted on the side on which the cone tapers outwards.

The generator will often be housed in a conical portion of the propeller casing, thus making other advantageous layouts possible.

The generator can be driven using a rotation speed converter extending as far as the propeller support shaft and connected to the end of the shaft, noting that it will be easy to manufacture this converter to be compact and light weight, since the propeller support shaft is adjacent to the generator rotor. It is thus in a plausible configuration in which the generator is housed between a support bearing of the propeller support shaft by the casing and a toothed drive wheel of said propeller support shaft by a turbine shaft of the turboprop, to take advantage of a space and fairly large voids in this location, and an improvement is obtained if the shaft end comprises one end separated from the rotor by one of the support bearings, and a connector of the speed converter at said end, the converter then also being well integrated into the turboprop, with a compact and simple construction.

It will generally be useful to disconnect the generator whenever required, during operating steps in which its operation is unnecessary. Advantageously, the preceding constructions may then include an uncoupling system between the connector of the speed converter and the generator.

One problem that also needs to be considered is cooling of the generator. This problem can be solved if it is housed in a chamber containing at least one roller bearing that is lubricated by oil circulation, the oil then being used to evacuate heat produced by the generator and its bearings. In other constructions, it will be easy to provide the casing with ribs around the generator, in this case to facilitate evacuation of heat by conduction to the exterior through the casing and then by convection with surrounding fresh air circulating around the casing. Another cooling alternative by exchange with engine fuel could also be envisaged to absorb heat rejected from the generator. The electronic components that are used to control the electrical machine will be judiciously positioned all around the active parts of the machine to facilitate their cooling.

These aspects, characteristics and advantages of the invention, and others, will now be described with reference to the following figures that illustrate one embodiment of the invention, not exclusive of other embodiments:

Figure 1:
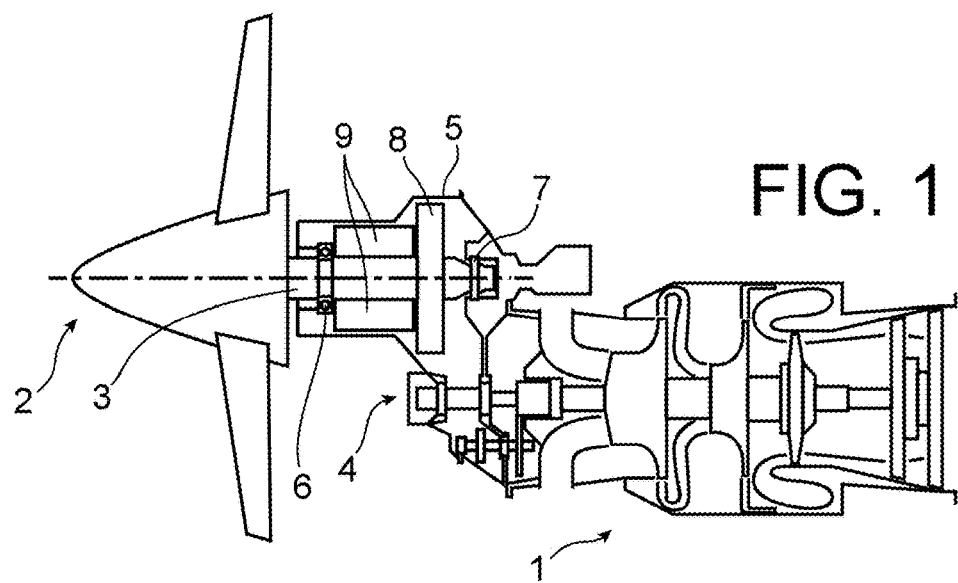
FIG. 1 is an overview of the turboprop.

FIG. 1 represents the turboprop according to the invention, comprising a gas turbine 1, a propeller 2, a propeller support shaft 3 extending towards the gas turbine 1, and that can be connected to a turbine shaft 4 that is parallel to it and extends at a small distance from it, by a known transmission that is not represented. The propeller support shaft 3 is surrounded by a protection casing 5. It is supported in the casing 5 by bearings 6 and 7. One of the bearings 6 is close to the propeller 2 and the other of the bearings 7 is adjacent to a toothed wheel 8 that drives the propeller support shaft 3, that engages with the transmission mentioned above. An electricity generator 9, characteristic of the invention, is arranged to be concentric around the propeller support shaft 3, between the first bearing 6 and the toothed wheel 8, being surrounded by the casing 5.

Figure 2:
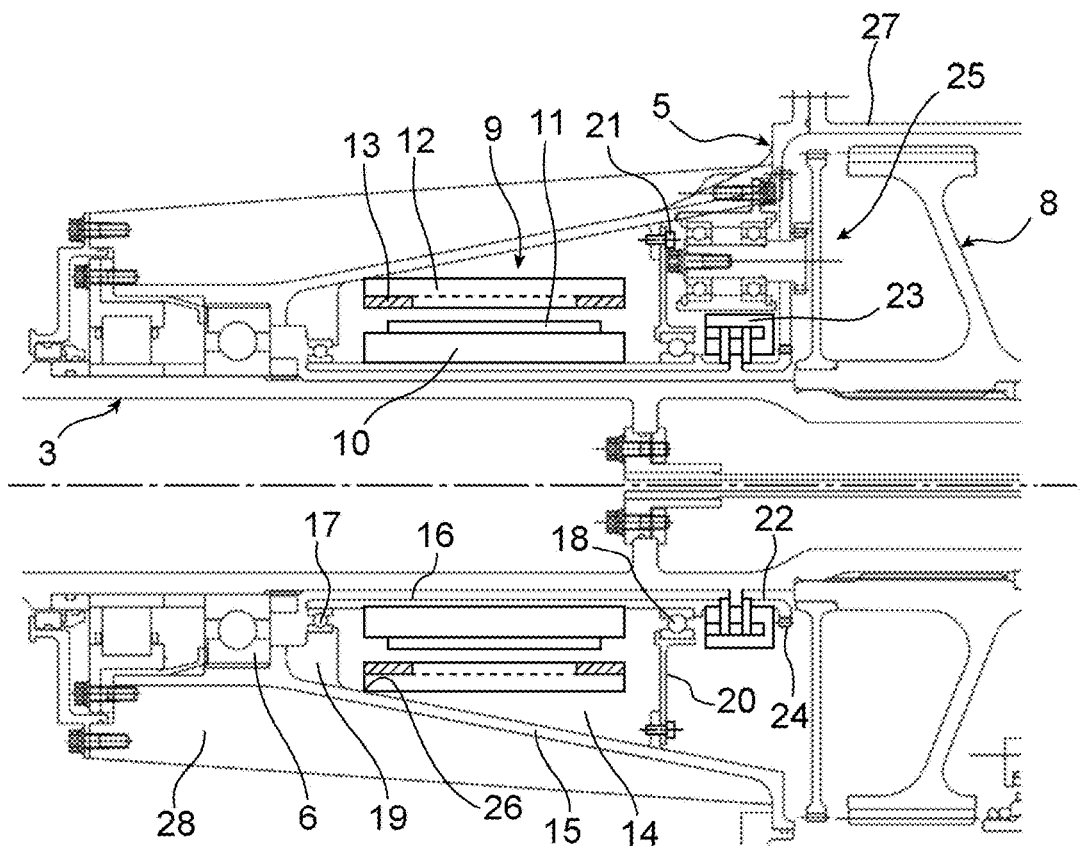
FIG. 2 illustrates the generator and its surroundings.

We will now give the commentary for FIG. 2.

The generator 9 is annular and comprises a hollow rotor 10 with magnetic poles 11 at its external periphery, and a stator 12 surrounding the rotor 10, concentric with the rotor and provided with windings 13 facing the magnetic poles 11. The generator 9 is housed in a cavity 14 surrounding the propeller support shaft 3, delimited by a conical portion 15 of the casing 5, between the first roller bearing 6 and the toothed wheel 8. The rotor 10 is supported by a shaft end 16, itself supported by two roller bearings 17 and 18, each of which is mounted on a partition 19 or 20 fixed to the conical portion 15 and perpendicular to the propeller support shaft 3. However, the partition 20 closest to the toothed wheel 8 and located on the flared side of the conical portion 15, can be detached from the remaining part of the structure, being connected to the casing 5 by screws 21.

The shaft end 16 extends at a small distance from the propeller support shaft 3 with which it is concentric. It comprises an end 22 prolonging it beyond the roller bearings 17 and 18 towards the toothed wheel 8 and that is connected to the remainder of the shaft end 16 by a decoupling device 23. The end 22 supports gear teeth 24 to connect the shaft end 16 to a speed converter 25, that may consist of a series of gears that extend as far as the propeller support shaft 3 close to the toothed wheel 8 at the gear teeth 24 so as to drive the shaft end 16 with a rotation multiplication ratio determined with regard to the propeller support shaft 3. It is seen that the converter 25 is well integrated into its environment, being small, in the same way as the decoupling device 23. The same thing can be said of the generator 9, the stator 12 of which can be directly built into a circular cavity 26 in the casing 5. The installation of the generator 9, and its removal if necessary for replacement, is also very simple because all that is necessary after removing the casing 5 from a neighbouring casing element 27, is to remove the converter 25, then the partition 20, to remove the shaft end 16 and the rotor 10, then the stator 12, the opening exposed by the partition 20 having a larger radius.

Ribs 28 incorporated into the casing 5 are shown extending particularly around the conical portion 15, one function of which is to evacuate heat generated by the generator 9 to the exterior. The same objective could be achieved by appropriate lubrication of a sealed chamber containing in particular the cavity 14, to lubricate the roller bearings contained in it, and possible the roller bearings 17 and 18. A sealed internal chamber dedicated to the machine can only be made if two dynamic sealing devices (not shown) are put into place adjacent to the left and to the right of roller bearings 17 and 18 respectively, in other words the roller bearings 17 and 18 both extend between these devices. This device could make use of different technologies: friction lip seal, carbon ring type mechanical packing that can have contact-free bearing, or finally an air labyrinth seal.

The decoupling device 23 is actuated to make the generator 9 active only when required by solidarising the end 22 to the remaining part of the shaft end 16 to drive the rotor 10 by the converter 25 and the propeller support shaft 3. When on the contrary the device 23 is decoupled, the shaft end 16 is free and the magnetic resistance with the stator 12 remains immobile.

The propeller support shaft typically rotates at 2 000 rpm; it is envisaged to rotate the shaft end 16 at about 20 000 rpm, which does not imply any severe constraints on the manufacture of the converter 25. Heat generated by the generator 9 is estimated at 1 kW or less, for electrical generation of 20 kVA, and therefore it can easily be dissipated.

What is claimed is:

1. A turboprop comprising a propeller, a propeller support shaft, an electricity generator located around the propeller support shaft, a casing surround the propeller support shaft and that also surrounds the generator, carries a stator of the generator, wherein the casing surrounding the generator also carries shaft end support bearings, a rotor of the generator being supported by the shaft end, and in that the casing comprises a removable flange that carries one of said bearings, extending perpendicular to the propeller support shaft, and exposing an opening with a larger radius that the generator in the casing when said flange is removed.

2. The turboprop according to claim 1, wherein the casing is conical around the generator.

3. The turboprop according to claim 1, further comprising a rotation speed converter extending as far as the propeller support shaft and connected to the shaft end.

4. The turboprop according to claim 3, wherein the shaft end comprises one end separated from the rotor by bearings supporting the shaft end, and the rotation speed converter being connected to said end.

5. The turboprop according to claim 4, wherein said end comprises a system to decouple said connector from the generator.

6. The turboprop according to claim 1, wherein the generator is housed between a support roller bearing of the propeller support shaft by the casing and a toothed drive wheel of said propeller support shaft by a turbine shaft of the turboprop.

7. The turboprop according to claim 6, wherein the shaft end comprises one end separated from the rotor by bearings supporting the shaft end, and the rotation speed converter being connected to said end.

8. The turboprop according to claim 1, wherein the generator is housed in a chamber containing at least one roller bearing lubricated by oil circulation.

9. The turboprop according to claim 1, wherein the casing is ribbed around the generator.

* * * * *